(12) United States Patent
Goto

(10) Patent No.: US 8,555,918 B2
(45) Date of Patent: Oct. 15, 2013

(54) FLOW RATE CONTROL VALVE AND SPOOL POSITION DETECTION DEVICE FOR THE FLOW RATE CONTROL VALVE

(75) Inventor: Atsushi Goto, Fuchu (JP)

(73) Assignee: Amiteq Co., Ltd. (JP)

( * ) Notice: Subject to any disclaimer, the term of this patent is extended or adjusted under 35 U.S.C. 154(b) by 402 days.

(21) Appl. No.: 12/671,396

(22) PCT Filed: Jul. 31, 2008

(86) PCT No.: PCT/JP2008/063774
§ 371 (c)(1),
(2), (4) Date: Jan. 29, 2010

(87) PCT Pub. No.: WO2009/017196
PCT Pub. Date: Feb. 5, 2009

(65) Prior Publication Data
US 2010/0200785 A1    Aug. 12, 2010

(30) Foreign Application Priority Data

Jul. 31, 2007  (JP) .................................. 2007-198214

(51) Int. Cl.
*F16K 37/00*    (2006.01)
(52) U.S. Cl.
USPC . 137/554; 137/552; 251/129.04; 324/207.17; 324/207.18
(58) Field of Classification Search
USPC ......... 137/554, 552; 251/129.04; 324/207.12, 324/207.16, 225, 207.17–207.19
See application file for complete search history.

(56) References Cited

U.S. PATENT DOCUMENTS

| 3,994,163 | A | * | 11/1976 | Rogers ..................... 73/152.56 |
| 5,045,785 | A | * | 9/1991 | Hansen .................. 324/207.16 |
| 5,101,856 | A | * | 4/1992 | Kakinuma et al. ........... 137/554 |
| 5,117,182 | A | * | 5/1992 | Cecco et al. .................. 324/220 |
| 5,663,631 | A | * | 9/1997 | Kajiura et al. .................. 322/29 |

(Continued)

FOREIGN PATENT DOCUMENTS

| JP | 60-148905 A | 10/1985 |
| JP | 62-287606 A | 12/1987 |

(Continued)

OTHER PUBLICATIONS

International Search Report issued in related PCT/JP2008/063775, mailed Nov. 4, 2008.

*Primary Examiner* — Stephen M Hepperle
*Assistant Examiner* — Ian Paquette
(74) *Attorney, Agent, or Firm* — Rossi, Kimms & McDowell LLP

(57) ABSTRACT

Flow rate control valve includes: a target probe formed of a magnetically-responsive substance and mounted to one end of a spool; a sensor housing mounted to the one end of the sleeve and having a cylinder section defining an inner space to permit entry therein of the target probe; and first and second coils provided around the cylinder section and axially spaced from each other by a predetermined distance. The probe is constructed so that magnetic response of the coils gradually varies in one direction in response to a linear position of the target probe. The first coil responds to the target probe, while the second coil does not respond to the target probe. Impedance of the first coil varies with a linear position of the probe (31), and the linear position of the probe is detected through differential synthesis performed between outputs of the first and second coils.

10 Claims, 6 Drawing Sheets

(56) References Cited

U.S. PATENT DOCUMENTS

| | | | |
|---|---|---|---|
| 5,787,915 A * | 8/1998 | Byers et al. ........................ 137/1 |
| H1854 H * | 7/2000 | Boston et al. ............ 324/207.15 |
| 6,580,264 B2 * | 6/2003 | Nekado .................... 324/207.16 |
| 6,600,311 B1 | 7/2003 | Tawaratsumida et al. |
| 2002/0066312 A1 * | 6/2002 | Lebrun et al. ................... 73/168 |
| 2004/0066184 A1 * | 4/2004 | Kobayashi et al. ...... 324/207.12 |
| 2004/0080313 A1 * | 4/2004 | Brosh ...................... 324/207.18 |
| 2007/0209716 A1 * | 9/2007 | Rankin ......................... 137/554 |
| 2007/0229064 A1 * | 10/2007 | Van Steenwyk et al. 324/207.26 |
| 2008/0202608 A1 * | 8/2008 | Tschida et al. ................ 137/554 |

FOREIGN PATENT DOCUMENTS

| | | |
|---|---|---|
| JP | 5-280914 A | 10/1993 |
| JP | 7-043105 A | 2/1995 |
| JP | 9-177137 A | 7/1997 |
| JP | 2000-213506 A | 8/2000 |
| JP | 2000-337808 A | 12/2000 |
| JP | 2002-297243 A | 10/2002 |
| JP | 2003-329404 A | 11/2003 |
| JP | 2006-220671 A | 8/2006 |

* cited by examiner

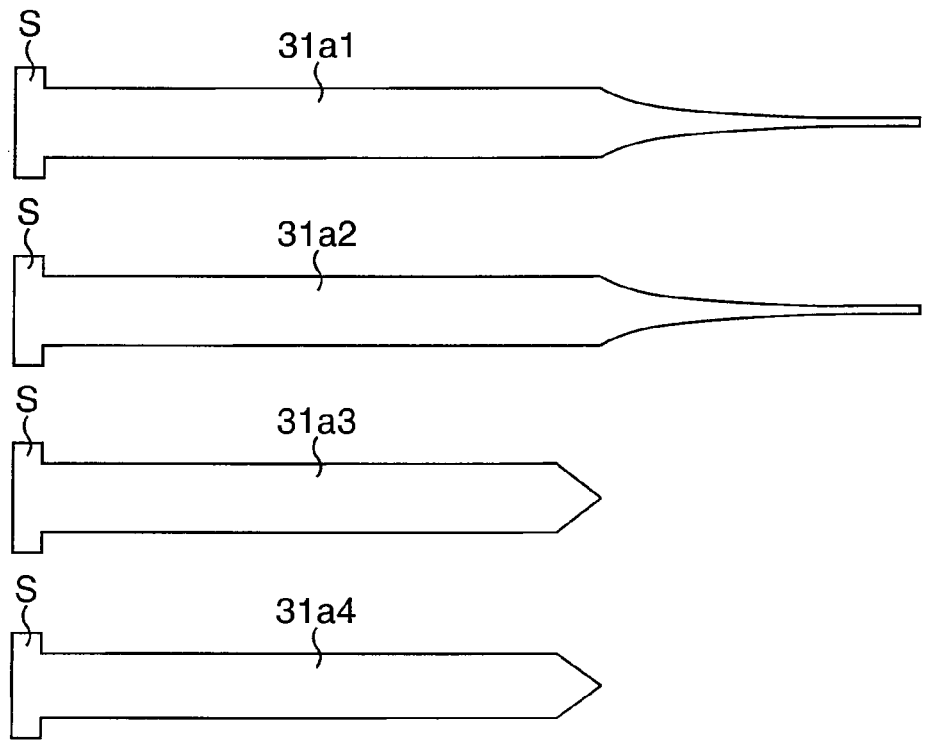
F I G. 8B
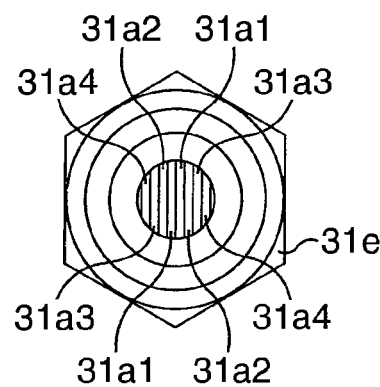
F I G. 8C

FLOW RATE CONTROL VALVE AND SPOOL POSITION DETECTION DEVICE FOR THE FLOW RATE CONTROL VALVE

TECHNICAL FIELD

The present invention relates to a spool-type flow rate control valve for use as a fluid flow rate control valve, and a spool position detection device for the flow rate control valve.

BACKGROUND ART

In the fields of construction machines/vehicles, other types of machines/vehicles, etc., fluid pressure devices, such as fluid pressure cylinders, are used as driving actuators for working machines. In driving such a fluid pressure device, pressurized fluid having a controlled direction and flow rate is supplied to a given fluid pressure port via a flow rate control valve. Examples of the fluid pressure devices of the aforementioned type include the ones disclosed in Japanese Patent Application Laid-open Publication No. HEI-9-177137 (hereinafter referred to as "patent literature 1") and in Japanese Patent Application Laid-open Publication No. 2000-213506 (hereinafter referred to as "patent literature 2"), and various types of pilot valves are used as the flow rate control valve. The flow rate control valve is constructed as a servo valve, and a position of a spool of the flow rate control valve is detected by a position detector so that spool position detection data is fed back to an actuator that drives the spool. One example of a spool-type flow rate control valve having such a position detection function is disclosed in Japanese Patent Application Laid-open Publication No. 2002-297243 (hereinafter referred to as "patent literature 3").

Today, various types of position detectors are known, such as an electric resistance type, electromagnetic type, optical type, etc. The position detector of the electric resistance type using a potentiometer is not satisfactory in terms of durability because it has mechanical contacts. The position detector of the optical type has a drawback of requiring cumbersome maintenance if it is used in an ambient environment that tends to be easily contaminated, although it can detect a position in a contactless manner. Further, the position detector of the electromagnetic type using an AC-energized coil has advantages that it can detect a position in a contactless manner and is durable even in an easily-contaminated environment. However, with the position detector of the electromagnetic type, how to compensate for coil impedance variation, which occurs due to a temperature characteristic, so as to achieve position detection with high accuracy becomes an important issue. Further, no matter of what type the position detector may be, it is desirable that the position detector be of simple construction and require only low manufacturing cost.

Further, flow rate control valves of various sizes are available depending on different purposes of use. If a maximum variation amount of a spool, which is an object of detection, differs, the conventionally-known spool position detection device must use a position sensor having a detectable range corresponding to the different maximum variation amount. Thus, in the past, it was necessary to prepare different position detection devices for various models of flow rate control valves of various sizes.

DISCLOSURE OF THE INVENTION

In view of the foregoing, it is an object of the present invention to provide an improved flow rate control valve equipped with an electromagnetic type position detection device which is simple in construction and can be manufactured at low cost and which yet has a sufficient durability, is highly durable even in a severe use environment and can achieve a superior temperature compensation performance. It is another object of the present invention to provide an improved spool position detection device for a flow rate control valve which is simple in construction and can be manufactured at low cost and which yet has a sufficient durability, is highly durable even in a severe use environment and can achieve a superior temperature compensation performance. It is another object of the present invention to provide an improved spool position detection device which can be used for flow rate control valves of different sizes.

The present invention provides a flow rate control valve including a spool having a plurality of valve members and slidably accommodated in a sleeve having a plurality of ports, the flow rate control valve performing flow rate control by linearly moving the spool by means of an actuator, which comprises: a generally straight target probe formed of a magnetically-responsive substance and mounted to one end of the spool, the sleeve having an opening formed in one end thereof to permit passage therethrough of the target probe; a sensor housing mounted to the one end of the sleeve for detecting a linear position of the target probe, the sensor housing having a cylinder section formed of a non-magnetic substance and defining an inner space to permit entry therein of the target probe, the inner space communicating with the opening formed in the one end of the sleeve; and first and second coils disposed around the cylinder section within the sensor housing and axially spaced from each other by a predetermined distance, the first coil being disposed so as to respond to the target probe, the target probe being constructed in such a manner that magnetic response of the first coil gradually varies in one direction in response to a changing linear position of the target probe, the second coil being constructed so as not to respond to linear displacement of the target probe at least within a predetermined linear displacement range of the target probe. Thus, a linear position of the target probe, and hence a position of the spool, is detected through differential synthesis performed between outputs of the first and second coil.

According to the present invention, as the target probe moves in response to displacement of the spool in the flow rate control value, the first and second coils within the housing detect a position of the target probe, so that a position of the spool can be detected. Namely, the target probe projects out of the sleeve through the opening, formed in the one end of the sleeve, to enter an inner space within the sensor housing. Of the first and second coils disposed around the cylinder section within the sensor housing and axially spaced from each other by the predetermined distance, only the first coil (e.g., coil located near the target probe) is disposed to respond to the target probe; thus, the magnetic response of the first coil gradually varies in response to a changing linear position of the target probe. The second coil (e.g., coil located remote from the target probe), on the other hand, is constructed so as not to respond to linear displacement of the target probe at least within the predetermined linear displacement range of the target probe. If the first and second coils have the same characteristics (such as the same number of turns), then impedance variation components appear in the first and second coils due to their temperature characteristics in the same sign and same value, and thus, a position detection signal, obtained through the differential synthesis between the outputs of the first and second coils, can have the impedance variation components, appearing in the first and second coils due to the temperature characteristics, duly removed therefrom by the impedance variation components canceling each other out. In this way, the present invention can achieve appropriate temperature characteristic compensation. Further, because the output of the second coil does not vary in response to a position of the target probe, the position detection signal, obtained through the differential synthesis between the outputs of the first and second coils, is a signal reflecting variation of the output of the first coil and detecting a linear position of the target probe and hence a position of the spool.

Because the second coil is provided in such a manner that its output does not substantively vary in response to a position of the target probe, the construction (shape) of the target probe can be made to gradually vary in one direction, so that the construction of the flow rate control valve can be simplified. The simplified construction can reduce the necessary manufacturing cost. Further, because the number of the coils can be made just two, the present invention can even further simplify the construction of the flow rate control valve and reduce the manufacturing cost. Further, because the flow rate control valve of the present invention is of an electromagnetic type, it can have an increased durability and is highly durable even in a severe use environment. As a result, the present invention can provide an improved flow rate control valve equipped with an electromagnetic type position detection function which has sufficient durability, is highly durable even in a severe use environment and can be simplified in construction and manufactured at low cost.

In a preferred embodiment, a circuit for A.C.-energizing the first and second coils and a circuit for generating and outputting position detection data are accommodated in a space around the cylinder section within the sensor housing. With the various circuits necessary for the detection provided within the sensor housing, the present invention can implement the spool position detection function with a construction compact in size as a whole.

In a preferred embodiment, the first coil is located near the target probe while the second coil is located remote from the target probe. Further, the target probe has a length such that the distal end thereof does not enter a sensitive region of the second coil located remote the target probe. Thus, magnetic response of the remote second coil does not vary in response to a changing linear position of the target probe.

In another preferred embodiment, the target probe has a length such that the distal end thereof can enter a sensitive region of the second coil located remote the target probe, and the target probe has a shape such that, when the distal end thereof has entered the sensitive region of the second coil, a predetermined portion of the target probe near the proximal end thereof enters a sensitive region of the first coil and enhances a degree of sensitivity of the first coil so as to cancel out sensitivity of the second coil by means of the predetermined portion near the proximal end.

In still another preferred embodiment, a magnetically-responsive shield member is provided in a ring-shaped configuration inside the second coil. The provision of such a magnetically-responsive shield member too can prevent the magnetic response of the remote second coil from varying in response to a changing linear position of the target probe.

In a preferred embodiment, the size of the opening formed in the one end of the sleeve and a mounting structure of the sensor housing for mounting to the one end of the sleeve are designed to be usable for a plurality of types of flow rate control valves differing from each other in maximum displacement amount of the spool, and the inner space defined by the cylinder section within the sensor housing has a length capable of accommodating a longest maximum displacement amount of the spool among the plurality of types of flow rate control valves. Thus, the same sensor housing having the first and second coils accommodated therein is applicable to the plurality of types of flow rate control valves while the target probe of a different size is used for each of the plurality of types of flow rate control valves. Because such an arrangement allows the same sensor housing, having the first and second coils accommodated therein, to be applied to the plurality of types of flow rate control valves, the present invention can eliminate a need for providing different position detection devices for various models of flow rate control valves of various sizes and thereby achieve reduction of manufacturing cost.

In a preferred embodiment, the flow rate control valve further comprises: a circuit for rectifying an A.C. detection signal, obtained through the differential synthesis between the outputs of the first and second coils, to thereby generate a D.C. detecting voltage signal; and a gain setting circuit for amplifying the D.C. detecting voltage signal. The gain setting circuit uses a gain setting resistance element having a predetermined temperature characteristic and sets the predetermined temperature characteristic of the gain setting resistance element so as to cancel out impedance variation caused by eddy current loss and a temperature characteristic of an element in the gain setting circuit. Such an arrangement can appropriately compensate for the eddy current loss and temperature characteristic of the element in the gain setting circuit.

According to another aspect of the present invention, there is provided a spool position detection device for a flow rate control valve that includes a spool having a plurality of valve members and slidably accommodated in a sleeve having a plurality of ports, the flow rate control valve performing flow rate control by linearly moving the spool by means of an actuator, the spool position detection device comprising: a generally straight target probe formed of a magnetically-responsive substance and mounted to one end of the spool, the sleeve having an opening formed in one end thereof to permit passage therethrough of the target probe; a sensor housing mounted to the one end of the sleeve for detecting a linear position of the target probe, the sensor housing having a cylinder section formed of a non-magnetic substance and defining an inner space to permit entry therein of the target probe, the inner space communicating with the opening formed in the one end of the sleeve; and first and second coils disposed around the cylinder section within the sensor housing and axially spaced from each other by a predetermined distance, the first coil being disposed so as to respond to the target probe, the target probe being constructed in such a manner that magnetic response of the first coil gradually varies in one direction in response to a changing linear position of the target probe, the second coil being constructed so as not to respond to linear displacement of the target probe at least within a predetermined linear displacement range of the target probe, the spool position detection device detecting a linear position of the target probe, and hence a position of the spool, by performing differential synthesis between outputs of the first and second coils. The spool position detection device has similar inventive features to the aforementioned flow rate control valve and achieves similar behavior and advantageous benefits to the aforementioned flow rate control valve.

BRIEF DESCRIPTION OF DRAWINGS

FIG. 8B is a side view showing example shapes of individual silicon steel plates constituting a laminated structure.

FIG. 8C is an end view of the target probe shown in FIG. 8A.

BEST MODE FOR CARRYING OUT THE INVENTION

Figure 1:
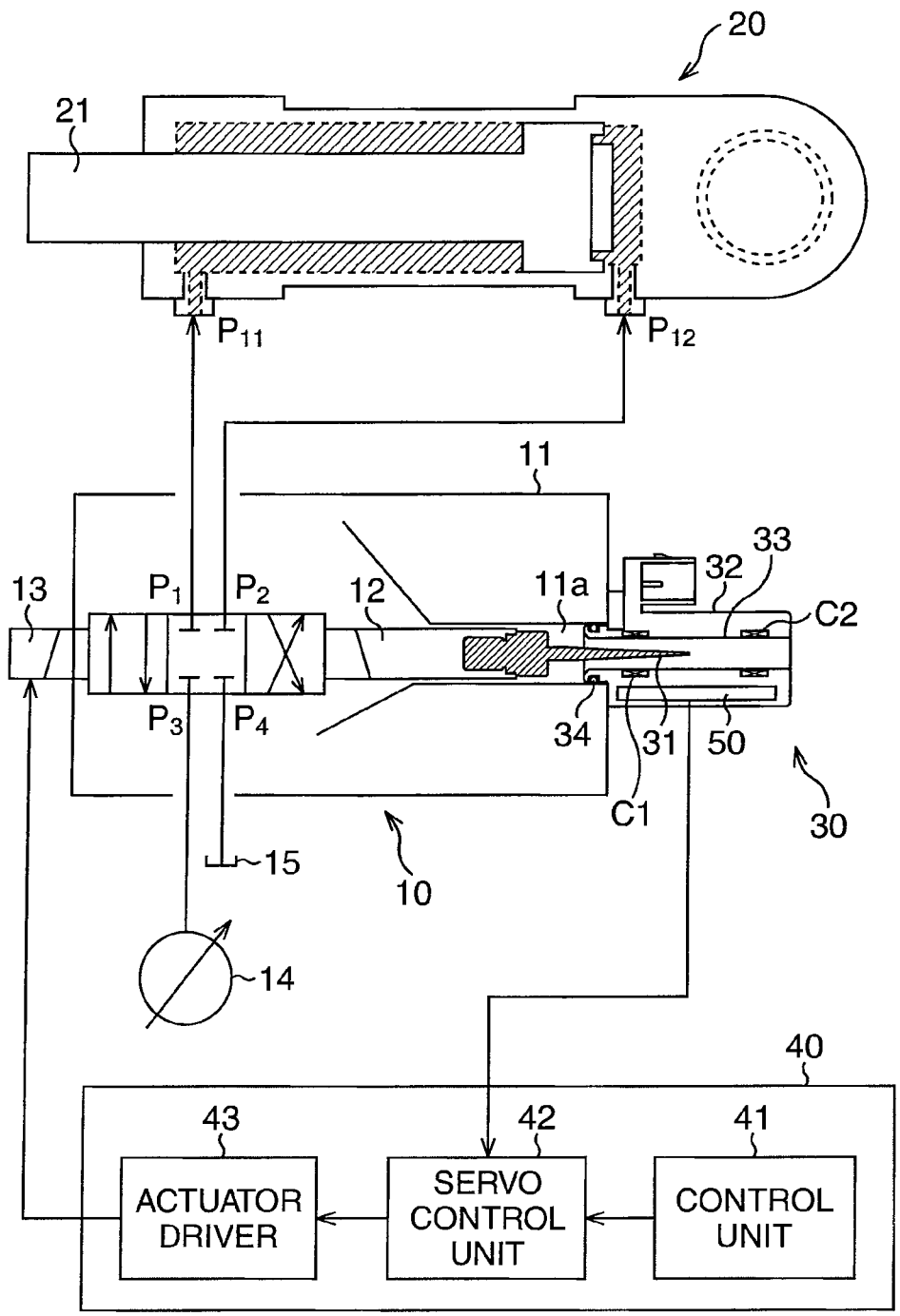
FIG. 1 is a block diagram showing an example of a system which controls driving of a fluid pressure cylinder by use of a spool-type flow rate control valve in accordance with an embodiment of the present invention.

FIG. 1 is a block diagram showing an example of a system which controls driving of a fluid pressure cylinder 20 by use of a spool-type flow rate control valve 10 in accordance with an embodiment of the present invention. As known in the art, the spool-type flow rate control valve 10 includes a spool 12 having a plurality of valve members (not shown) and slidably accommodated in a sleeve 11 having a plurality of ports P1, P2, P3 and P4, and it performs flow rate control by linearly moving the spool 12 by means of an actuator 13, such as a linear actuator like a solenoid. The ports P1 and P2 of the spool 12 are connected to ports P11 and P12, respectively, of the fluid pressure cylinder 20, and the ports P3 and P4 of the spool 12 are connected to a fluid supply source (pump) 14 and tank 15, respectively. As also known in the art, a piston rod 21 of the fluid pressure cylinder 20 is driven in accordance with flow rates and directions of pressurized fluid given to the ports P11 and P12 of the fluid pressure cylinder 20 via the spool-type flow rate control valve 10. Note that the above-mentioned sleeve 11, spool 12 and ports P1, P2, P3 and P4 are shown in schematic representation in FIG. 1.

The system also includes a spool position detection device 30 for detecting a position of the spool 12 of the spool-type flow rate control valve 10. The spool position detection device 30 detects a linear position of the spool 12 linearly driven by the actuator 13 and gives position data, indicative of the detected spool position, to a servo control unit 42 of a control device 40.

The control device 40, which controls of driving of the piston rod 21 of the fluid pressure cylinder 20, includes a main control unit 41, the servo control unit 42 and an actuator driver 43. For example, the main control unit 41 receives an instruction for driving the fluid pressure cylinder 20 and position data of the piston rod 21 detected by a piston rod position detection device (not shown) mounted to the fluid pressure cylinder 20 and generates a spool position instruction signal for the flow rate control valve 10. The spool position instruction signal generated by the main control unit 41 is given to the servo control unit 42. Then, using the spool position instruction signal, given from the main control unit 41, as an instruction value and using the spool position detection data, given from the spool position detection device 30, as a feedback value, the servo control unit 42 supplies a driving signal to the actuator 13 via an actuator driver 43 and servo-controls a position of the spool 12 (i.e., valve position) of the flow rate control valve 10. The flow rate of the pressurized fluid to be supplied to the fluid pressure cylinder 20 is controlled by the position of the spool 12 (i.e., valve position) being controlled by the servo control unit 42.

The following paragraphs describe the spool position detection device 30 and a mounting structure with which the spool position detection device 30 is mounted to the flow rate control valve 10.

Figure 2A:
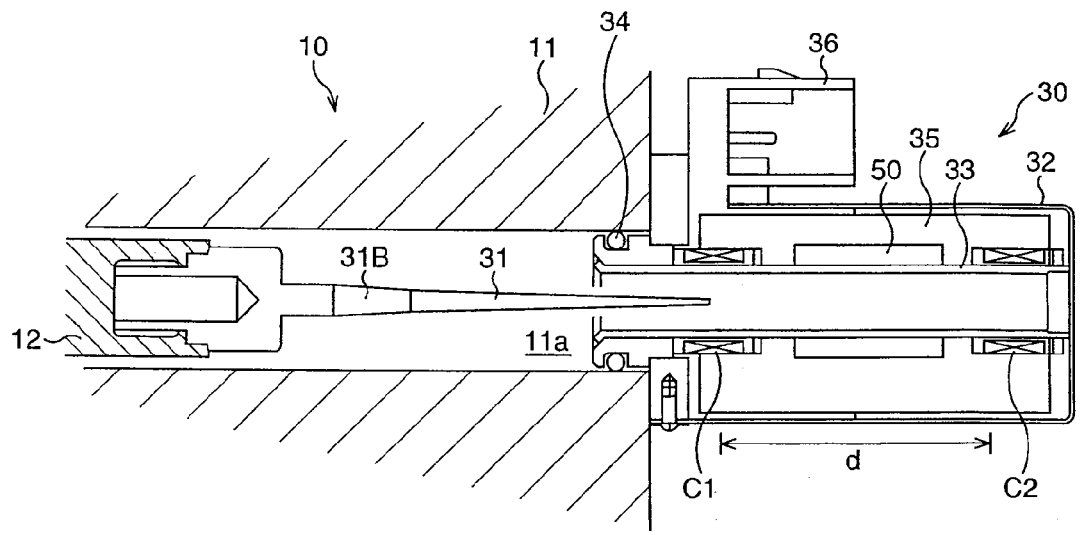
FIG. 2A is an enlarged sectional view of a spool position detection device, which shows an example where the device is applied to spool position detection of a long stroke.

As shown in an enlarged sectional view of FIG. 2A, the spool position detection device 30 includes a generally straight target probe 31 formed of a magnetically-responsive substance (e.g., magnetic substance), and a sensor housing 32. The target probe 31 is mounted to one end of the spool 12. The target probe 31 may be detachably mounted to the one end of the spool 12 by screwing or the like. The sleeve 11 of the flow rate control valve 10 has an opening 11a formed in one end thereof to permit passage therethrough of the target probe 31. The sensor housing 32 has a cylinder section 33 defining an inner space to permit entry therein of the target probe 31 and is fixed, via an O-ring 34, to the one end of the sleeve 11 of the flow rate control valve 10, where the opening 11a is formed, in an air-tight or fluid-tight manner such that the inner space communicates with the opening 11a formed in the one end of the sleeve 11.

The cylinder section 33 is formed of a non-magnetically-responsive substance (preferably, a non-magnetic and non-electrically-conductive substance, or at least a non-magnetic substance), and first and second coils C1 and C2 are provided around the outer periphery of the cylinder section 33 and axially spaced from each other by a predetermined distance d. Because the cylinder section 33 is in a same fluid pressure environment as the interior of the sleeve 11, it is preferable that the cylinder section 33 be made of a strong, highly pressure-resistant substance, such as SUS316 stainless steel. It is also desirable that the first coil C1 and the second coil C2 have same characteristics, such as a same line thickness, same number of turns, etc. This is for the purpose of allowing the first and second coils C1 and C2 to present same impedance variation. However, even if the two coils C1 and C2 are slightly different from each other in characteristic, the present invention can accomplish desired objects by performing suitable design adjustment.

As shown in a side view of FIG. 2A, the target probe 31 has a circular conical shape elongated in its axial direction such that its volume gradually decreases toward the distal end. FIG. 2A shows the target probe 31 located at its leftmost position (i.e., the spool 12 in its leftmost position). In this state, the distal end of the target probe 31 is located substantially centrally in the near first coil C, and the distal end of the target probe 31 (namely, the spool 12) can move rightward in the figure from that state. As the target probe 31 moves further rightward, the volume of a portion entering the first coil C1 gradually increases, so that a coefficient of magnetic coupling to the first coil C1 gradually increases. Thus, the impedance of the first coil C1 gradually varies in response to a changing linear position of the target probe 31. In the target probe 31, the portion gradually varying in volume has a length that permits measurement of maximum displacement of the spool 12. The construction of the target probe 31 and/or positional arrangement of the coils C1 and C2 are appropriately set in such a manner that, even when the distal end of the target probe 31 is located at its rightmost position (i.e., the spool 12 is located at its rightmost position), it does not influence one of the coils C2 that is remoter from the target probe 31. For that purpose, any one or a combination of the following three options (1)-(3) may be employed:

(1) setting an appropriate distance d between the coils C1 and C2;

(2) setting an appropriate shape of the target probe 31; and (3) applying an appropriate magnetic sealing to the coil C2.

In the case of Option (1) above, the appropriate distance d between the first coil C1 and the second coil C2 is substantially equal to or greater than a maximum measurable distance, and the length of the target probe 31 is designed such that the distal end of the target probe 31 never enters a sensitive region of the remoter coil C2. Thus, whereas the impedance of the first coil C1 varies in response to a linear position of the target probe 31, the impedance of the second coil C2 never varies in response to a linear position of the target probe 31.

In the case of Option (2), the length of the target probe 31 may be designed such that the distal end of the target probe 31 enters the sensitive region of the remoter coil C2. FIG. 2A shows an example where the target probe 31 is shaped in an appropriate manner as noted in Option (2) above. Namely, the target probe 31 is shaped in such a manner that a base portion (or near proximal-end portion) 31B of the target probe 31 presents a greater gradual volume change (gradual increase or decrease) rate. More specifically, as the distal end of the target probe 31 enters the sensitive region of the second coil C2, the base portion 31B enters the sensitive region of the first coil C1, so that impedance increase produced in the second coil C2 can be canceled out by impedance increase produced in the first coil C1. Thus, in most of the measurable range (stroke), where the distal end of the target probe 31 does not enter the sensitive region of the second coil C2, the impedance of the second coil C2 does not vary in response to a linear position of the target probe 31 although the impedance of the first impedance C1 varies in response to a linear position of the target probe 31. However, as the distal end of the target probe 31 enters the sensitive region of the second coil C2, the impedance of the second coil C2 varies but impedance increase corresponding to the impedance variation of the second coil C2 occurs in the first coil C1; thus, through a later-described cancellation effect, the foregoing is practically equivalent to a case where no impedance variation has been produced in the second coil C2. Namely, linearity of measured values can be secured throughout the entire measurable range.

Note that Option (3) above will be described later with reference to FIG. 5.

As noted above, whereas the impedance of the first coil C1 varies in response to a linear position of the target probe 31, the impedance of the second coil C2 can be made to not practically vary in response to a linear position of the target probe 31. Namely, because it is only necessary that the first coil C1 located near the target probe 31 respond to the target probe 31, the same sensor housing 32 can be used for the target probe 31 of any length as long as the length of the target probe 31 is not greater than a maximum measurable length determined by a construction of the sensor housing 32 having accommodated therein the two coils C1 and C2. It means that the same sensor housing 32 can be applied to flow rate control valves having any spool stroke length as long as the flow rate control valves are provided with a spool 12 having a maximum displaceable amount greater than the maximum measurable length determined by the construction of the sensor housing 32.

Figure 3:
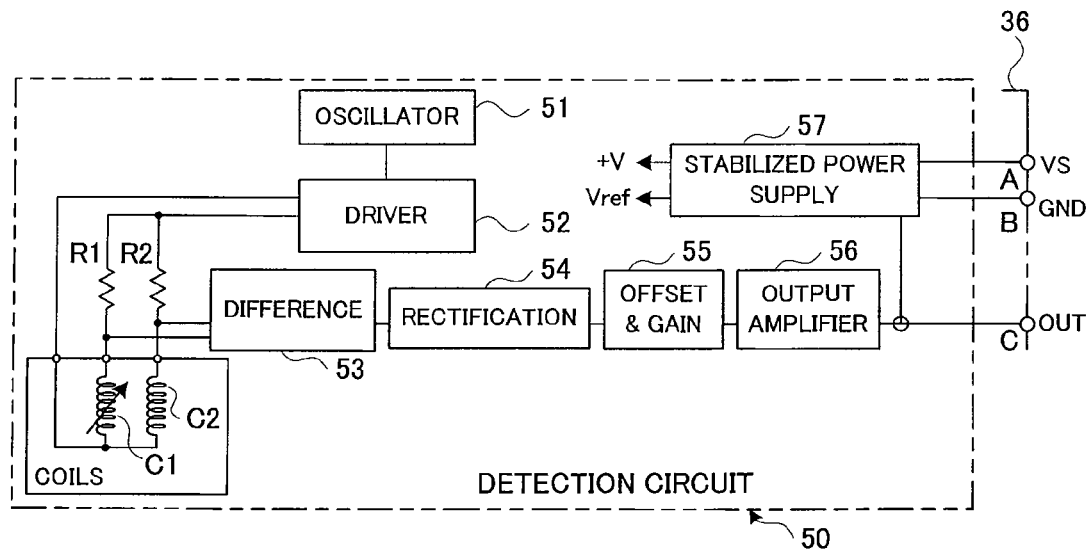
FIG. 3 is a block diagram showing an example setup of a detection circuit.

FIG. 3 shows an example setup of a detection circuit 50 provided in the spool position detection device 30. An A.C. signal of a predetermined frequency, generated from an oscillator 51, is applied to each of the coils C1 and C2 by way of a driver 52 and pull-up resistors R1 and R2. Output A.C. voltages V1 and V2 corresponding to impedances of the corresponding coils C1 and C2 are taken out from connection points between the pull-up resistors R1 and R2 and the coils C1 and C2 and then input to a difference circuit 53. The difference circuit 53 calculates a difference between the output A.C. voltages V1 and V2 (i.e., V1−V2), i.e. differentially synthesizes the voltages V1 and V2. An output A.C. signal of the difference circuit 53 is given to a rectification circuit 54, where the output A.C. signal is subjected to full-wave rectification to be converted to a D.C. voltage. An output of the rectification circuit 54 is a detection signal indicating a linear position of the target probe 31, i.e. position of the spool 12 in a D.C. voltage. The output D.C. signal of the rectification circuit 54 is given to an offset and gain adjustment circuit 55. The offset and gain adjustment circuit 55, which offsets a D.C. level of the detection signal and adjusts a gain of the detection signal, is provided for a design requirement in order to use the detection signal. An output signal of the offset and gain adjustment circuit 55 is output from an analog output terminal C via an output amplifier 56. The detection signal thus output from the analog output terminal C is given to the servo control unit 42 as a feedback signal of the spool position. Note that a terminal A is a D.C. power supply input terminal while a terminal B is a ground terminal and these terminals A and B are connected to a stabilized power supply circuit 57. Needless to say, the pull-up resistors R1 and R2 may be replaced with pull-down resistors.

The above-mentioned detection circuit 50 is accommodated in a stable manner in a space 35 around the cylinder section 33 within the sensor housing 32. As shown in FIG. 2A, a connector section 36 is attached to the sensor housing 32, and the terminals A-C are provided on the connector section 36.

The following describe relationship between the outputs of the coils C1 and C2 and the position of the target probe 31. If an initial value of the output voltage V1 of the first coil C1 when the target probe 31 is at its leftmost position is given as $V_0$ and a component based on impedance variation corresponding to the linear position of the target probe 31 is given as $V_x$, then the output voltage V1 of the first coil C1 can be expressed as $$V1 = V_0 + V_x$$

If an initial value of the output voltage V2 of the second coil C2 when the target probe 31 is at its leftmost position is given as $V_0'$ and it is assumed that the initial value $V_0'$ is maintained irrespective of positional variation of the target probe 31, then the output voltage V2 of the second coil C2 can be expressed as $$V2 = V_0'$$

Therefore, a difference between the output voltage V1 and the output voltage V2 can be expressed as $$V1 - V2 = V_0 + V_x - V_0'$$

Here, if $V_0$ and $V_0'$ are substantially equal, the difference value "V1−V2" will almost equal V. Further, $V_0$ and $V_0'$ may be slightly different from each other, in which case a difference "$V_0 - V_0'$" will just take an initial value (offset value). Thus, in each of the aforementioned cases, a detection signal based on impedance variation corresponding to the linear position of the target probe 31 can be provided on the basis of the difference value "V1−V2".

In the case where the device is designed in such a manner that the distal end of the target probe 31 never enters the sensitive region of the second coil C2 as set forth in (1) above, the aforementioned relationship simply applies throughout the entire stroke. Further, in the case where the device is designed in such a manner that the distal end of the target probe 31 may enter the sensitive region of the second coil C2 at the end of the stroke as set forth in (2) above, the aforementioned relationship simply applies in most of the stroke other than the sensitive region. Once the distal end of the target probe 31 enters the sensitive region of the second coil C2 at the end of the stroke, a variation value $V_x'$ corresponding to positional variation of the target probe 31 is added to the output voltage V2 of the second coil C2 as expressed by $$V2=V_0'+V_x'$$

However, in such a case, the device may be designed in such a manner that the base portion 31B of the target probe 31 enters the sensitive region of the first coil C1 and a variation value $V_x'$ similar to the above is added in response to the entry of the base portion 31B. Then, $$V1=V_0+V_x+V_x',$$

and a difference between V1 and V2 can be calculated as $$V1-V2=V_0+V_x+V_x'-(V_0'+V_x')=V_0+V_x-V_0',$$

so that $V_x'$ is canceled out. Namely, this design is practically equivalent to a case where no impedance variation responsive to positional variation of the target probe 31 has been produced in the second coil C2.

The following describe temperature drift compensation etc. Impedance variation components $v_t$, produced by a temperature drift appear in the output voltages V1 and V2 of the coils C1 and C2 in the same sign (i.e., in the same direction). If output voltages V1 and V2 having temperature drift components removed therefrom are given as V1' and V2", respectively, $$V1=V1'+v_1$$

$$V1=V2'+v_1$$

and thus, a difference between the voltages V1 and V2 can be expressed as $$V1-V2=V1'+v_1-(V2'+v_t)=V1'-V2'$$

Namely, the temperature drift components of the same sign (same direction) can be removed through differential synthesis, so that it is possible to readily provide a high-accuracy detection signal having a compensated temperature drift characteristic.

Examples of impedance varying factors appearing in the output voltages V1 and V2 of the coils C1 and C2 in the same sign (i.e., in the same direction) include not only temperature characteristics but also simple resistances of coil windings, eddy-current loss in the cylinder section 33 made of nonmagnetic metal, such as SUS316 stainless steel, etc. and impedance variation components based on these factors too can be canceled out on the same principle as above.

Figure 4:
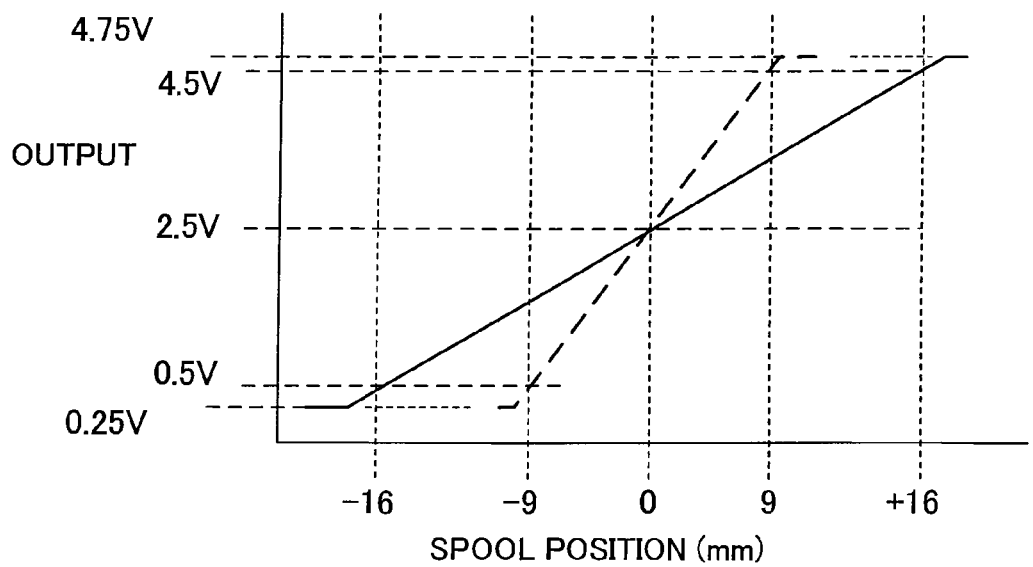
FIG. 4 is a graph showing examples of characteristics of detection signals corresponding to spool positions.

FIG. 4 is a graph showing examples of characteristics of the detection signal output from the output amplifier 56. The characteristic indicated by a solid line in the figure is one where one stroke range of the spool 12 is 32 mm, which allows one stroke range from −16 mm to +16 mm to be detected with a linear characteristic by D.C. voltage values in a range from 0.5 volts to 4.5 volts. In this example, a maximum measurable length or distance determined by the positional arrangement, within the sensor housing 32, of the coils C1 and C2 with the predetermined distance d therebetween is set at 32 mm. This means that, if one stroke range of the spool 12 is less than 32 mm, the same or common sensor housing 32 (which contains the coils C1 and C2 spaced apart from each other by the predetermined distance d, cylinder section 33 and detection circuit 50) can be used for any flow rate control valves 10.

Figure 2B:
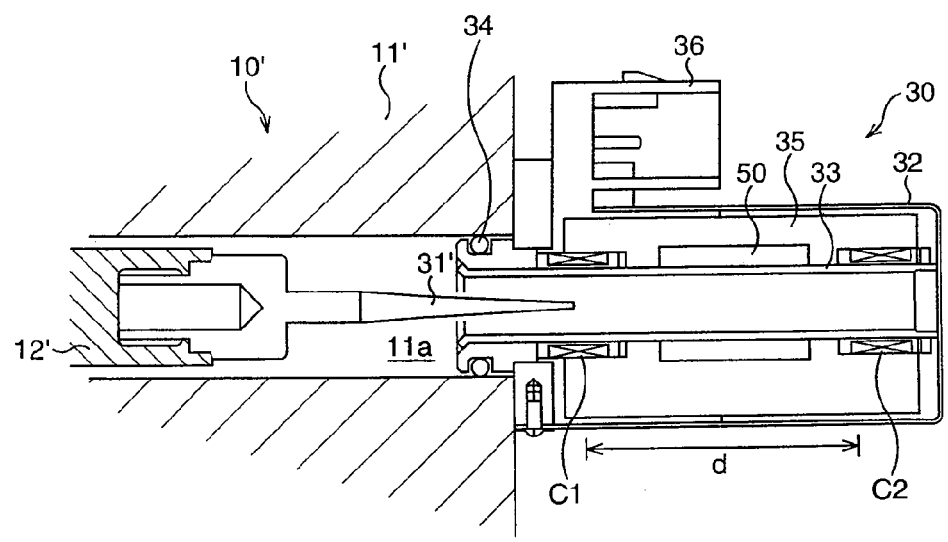
FIG. 2B is an enlarged sectional view of the spool position detection device, which shows an example where the device is applied to spool position detection of a short stroke.

FIG. 2B shows an example where a spool 12' of a flow rate control valve 10' has a stroke (e.g., 16 mm) shorter than that of the spool 12 shown in FIG. 2A. In this case, a target probe 31' fixed to one end of the spool 12' also has a portion gradually varying in volume, and this volume varying portion has a shorter length than the volume varying portion of FIG. 2A because of a shorter maximum measurable length. But, the same sensor housing 32 (which contains the coils C1 and C2 spaced apart from each other by the predetermined distance d, cylinder section 33 and detection circuit 50) as that shown in FIG. 2A can be used in the example of FIG. 2B. Note, however, that the offset and gain adjustment to be made by the offset and gain adjustment circuit 55 in the detection circuit 50 may be modified as appropriate. In this case, even when the target probe 31' advances to the rightmost position, the distal end of the target probe 31' does not reach the second coil C2, so that the second coil C2 is not influenced by the linear position of the target probe 31'. A broken line in FIG. 4 shows another example characteristic of the detection signal output from the output amplifier 56. In this case, one stroke range from −9 mm to +9 mm can be detected with a linear characteristic with a D.C. voltage value range from 0.5 volts to 4.5 volts. In the case of the shorter target probe 31', whose distal end never enters the remoter coil C2, there is no need to vary a gradual volume change (increase or decrease) rate of the base portion 31B as need in the case of the longer target probe 31. Whereas the entire length of the target probe 31' in the illustrated example of FIG. 2B is smaller than that of the target probe 31 of FIG. 2A, it may be almost the same as that of the target probe 31 of FIG. 2A, and the target probe 31' may be shaped such that its volume gradually varies in a short range thereof close to the distal end.

As apparent from the foregoing, the same sensor housing 32 having the first coil C1 and the second coil C2 accommodated therein can be used for a plurality of types of flow rate control valves 10 and 10', and thus, there is no need to prepare a different spool position detection device 30 (except for the target probe 31) for each of various model types of flow rate control valves having a variety of sizes. As a result, such common use or sharing of the sensor housing 32 and spool position detection device 30 achieves manufacturing cost reduction.

Figure 5:
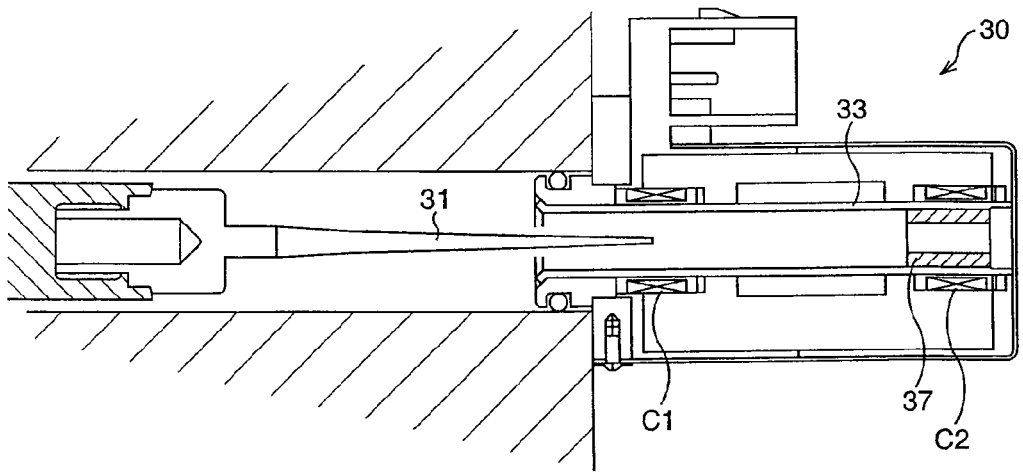
FIG. 5 is a sectional view showing a modified example of the spool position detection device.

FIG. 5 shows a modification of the present invention, where a ring-shaped magnetically-responsive shield member 37 is provided inside the second coil C2. The magnetically-responsive shield member 37 is formed of a magnetic substance if the target probe 31 is formed of a magnetic substance, or formed of an electric conductive substance if the target probe 31 is formed of an electric conductive substance, so that the shield member 37 serves to nullify a magnetic influence of the target probe 31 on the second coil C2. Namely, in this case, the second coil C2 always presents a constant great impedance, so that, even in case the target probe 31 enters the second coil C2, it is possible to prevent significant impedance variation responsive to variation in volume of a portion of the target probe 31 having entered the second coil C2. In this case, the distance d between the first and second coils C1 and C2 need not necessarily be equal to or greater than the maximum stroke range of the target probe 31, and the distance d may be smaller than the maximum stroke range of the target probe 31. Because, even in case the target probe 31 enters the second coil C2, the output is not substantively influenced (i.e., does not substantively vary) due to the entry. Whereas the shield member 37 is provided inside the cylinder section 33 in the illustrated example of FIG. 5, the present invention is not so limited, and the shield member 37 may be provided between the outer periphery of the cylinder section 33 and the inner periphery of the coil C2. Further, whereas the coils C1 and C2 are provided around the outer periphery of the cylinder section 33 in each of the above-described embodiments, the coils C1 and C2 may be provided around the inner periphery of the cylinder section 33. Note that, in the case where the shield member 37 is provided in relation to the second coil C2, the voltage V1 is greater than the voltage V2, so that the difference (V1−V2) takes a negative value. If it is desirable that the difference (V1−V2) take a positive value, then the difference circuit 53 may be modified to calculate a difference of "V2−V1".

Further, whereas the target probe 31 has been described above as formed of a magnetic substance, such as iron, the target probe 31 may be formed of an electric conductive substance, such as copper, so that impedance variation is produced by eddy current loss. Furthermore, the target probe 31 may be constructed as a hybrid type comprising a combination of magnetic and electric conductive substances. In such a case, because the impedance increasing/decreasing direction is opposite between the magnetic substance and the electric conductive substance, the target probe 31 may be constructed to have a pattern of the magnetic and electric conductive substances such that the impedance of the electric conductive substance gradually decreases as the impedance of the magnetic substance gradually increases.

Further, whereas the first coil C1 whose impedance varies in response to a changing position of the target probe 31 is provided near the target probe 31 in each of the above-described embodiments, the first coil C1 may be provided remoter from the target probe 31. For instance, the illustrated example of FIG. 5 allows such a design modification to be made with ease.

Figure 6:
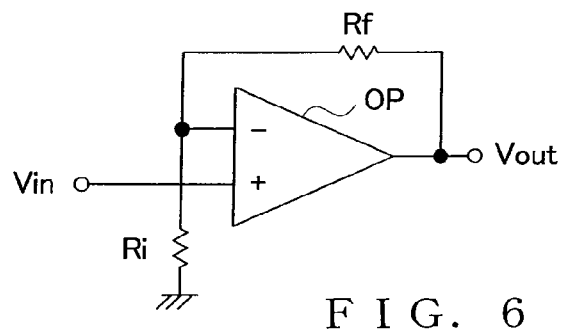
FIG. 6 is a circuit diagram showing an example of a gain setting amplifier employed in the detection circuit.

Lastly, a description will be given about how temperature characteristic compensation is performed using electric resistance elements provided in the detection circuit 50. Temperature characteristic variation of impedance of the detecting coil (first coil) C1 can be compensated for, as set forth above, by providing the second coil C2 and determining a difference between the outputs of the first and second coils C1 and C2 to thereby cancel out the temperature characteristic variation. However, because there would occur other problems, such as temperature characteristic variation of the target probe 31 due to eddy current loss of the target probe 31 formed of a magnetic substance and temperature characteristic variation of the individual circuit elements in the detecting circuit 50, it is also necessary to compensate for these problems in order to achieve an accurate position detection. Thus, the embodiment of the present invention is arranged to automatically perform comprehensive temperature characteristic compensation via a gain setting amplifier provided in the detecting circuit 50. For example, the offset and gain adjustment circuit 55 of the detecting circuit 50 includes the gain setting amplifier using an operational amplifier OP and electric resistance elements Rf and Ri as shown in FIG. 6. In such a case, however, if the electric resistance elements Rf and Ri greatly vary in impedance similarly to each other due to their temperature characteristics, then the gain would also greatly vary, which is very inconvenient. It is possible to prevent the gain from greatly varying in response to a temperature by using, as the electric resistance elements Rf and Ri, resistance elements having mutually-different predetermined temperature characteristics. For example, the gain setting amplifier may be designed in such a manner that a set gain becomes slightly smaller as the temperature increases; this arrangement can perform appropriate temperature compensation.

First, the gain setting resistance elements Rf and Ri are set at values cable of setting a desired gain. On the basis of a gain characteristic of a noninverting amplifier, relationship between an input voltage Vin and an output voltage Vout can be expressed as $$Vout = Vin(Rf+Ri)/Ri$$

Thus, values of the resistance elements Rf and Ri at a given reference temperature can be determined.

Then, calculation is made of temperature characteristic variation of the target probe 31 due to eddy current loss of the target probe 31 formed of a magnetic substance, temperature characteristic variation of the individual circuit elements in the detecting circuit 50, etc., and impedance variation components depending on these calculated temperature characteristic variation are provisionally calculated. Also, a predetermined temperature characteristic of one of the gain setting resistance elements Rf and Ri is determined so as to cancel out the synthesized impedance variation components depending on these calculated temperature characteristic variation. Today, a resistance element that presents, in minimum units of ppm/° C., desired impedance variation responsive to temperature variation per one ° C. has been developed and exists; thus, it is only necessary to use a resistance element having the determined temperature characteristic.

Because increase of the value of the ground-side resistance element Ri relative to the feeding-back resistance element Rf invites gain decrease in the aforementioned gain setting amplifier, a resistance element presenting desired temperature variation may be used as the ground-side resistance element Ri. Namely, as the temperature increases, the eddy current loss of the target probe 31 decreases, the output voltage of the detecting first coil C1 increases and the value of an impedance element in the detecting circuit 50 also increases, so that a position detecting voltage output from the rectification circuit 54 tends to increase. Then, it is only necessary to calculate voltage increase cased by the temperature characteristic and set a temperature characteristic of the ground-side resistance element Ri so as to invite gain increase such that the voltage increase is canceled out. In this manner, the impedance of the resistance element Ri having a predetermined characteristic increases in response to temperature increase and the gain of the above-mentioned gain setting amplifier decreases by an appropriate amount corresponding to the impedance increase, so that increase of the position detecting voltage due to eddy current loss of the target probe 31 formed of a magnetic substance and temperature characteristic variation of the individual circuit elements in the detecting circuit 50 can be canceled out by the decreased gain; thus, the desired temperature compensation can be performed with ease.

Figure 7:
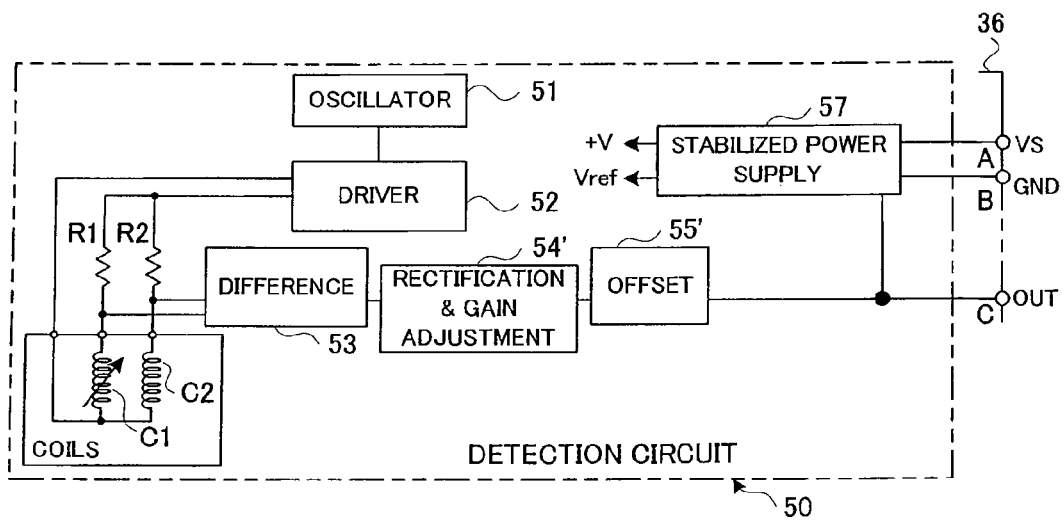
FIG. 7 is a block diagram showing another example of the detection circuit.

FIG. 7 is a block diagram showing a modification of the detecting circuit 50 shown in FIG. 3. In the modification of FIG. 7, a rectification and gain adjustment circuit 54' not only rectifies an output A.C. signal of the difference circuit 53 but also performs gain adjustment. The rectification circuit section of the rectification and gain adjustment circuit 54' includes an operational amplifier that controls an output gain. Thus, modification of FIG. 7 does not require the output amplifier 56 of FIG. 3. Further, because the rectification and gain adjustment circuit 54' has a gain adjustment function, an offset and adjustment circuit 55' need not have a gain adjusting function.

As one example scheme for forming the target probe 31 into a desired shape, a solid metal material may be cut in three dimensions. However, this scheme is disadvantageous in that it would require much processing time and labor. Thus, in order to avoid such a disadvantage, the inventor of the present invention proposes below a scheme for laminating a plurality of metal plate to form the target probe 31 of a desired shape.

Figure 8A:
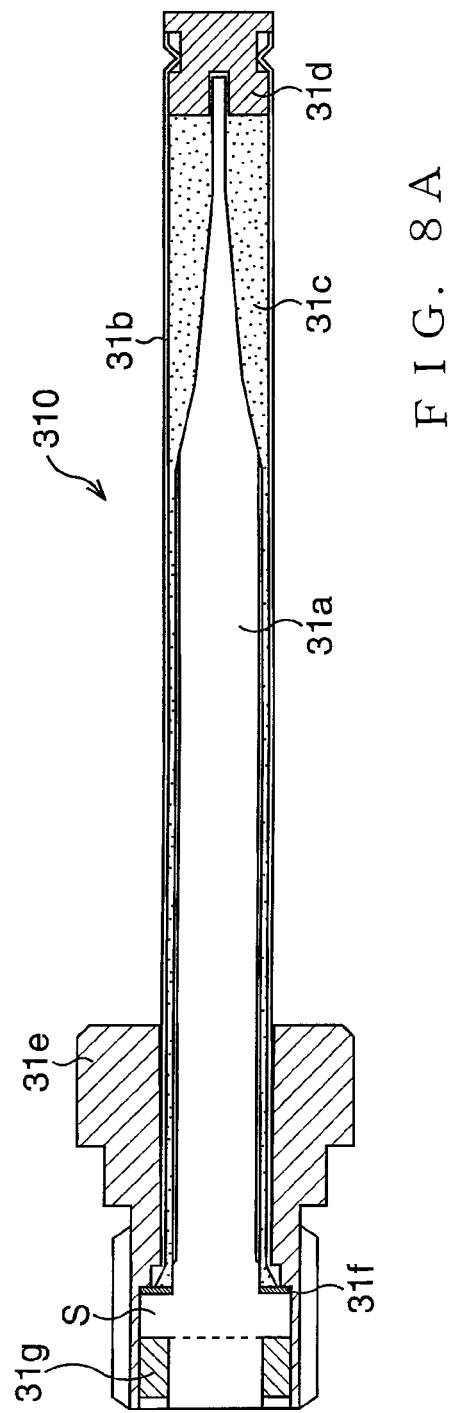
FIG. 8A is a sectional side view showing another example of a construction of a target probe.

FIG. 8A is a sectional side view of a second embodiment of the target probe 310. This target probe 310 mainly comprises a magnetic substance section 31a formed by laminating a plurality of silicon steel plates. More specifically, the magnetic substance section 31a formed by laminating a plurality of silicon steel plates is accommodated in a metal sheath tube 31c, a soft resin mold material 31c is filled in the remaining space of the sheath tube 31b, and the sheath tube 31b is sealed at its one end with a cap 31b. A holder 31e is mounted to the other end of the sheath tube 31b. As an example, the magnetic substance section 31a comprises four pairs of silicon steel plates 31a1, 31a2, 31a3 and 31a4, each of the pairs having a different length and distal end portion shape; that is, the magnetic substance section 31a comprises a total of eight silicon steel plates 31a1, 31a2, 31a3 and 31a4. FIG. 8C is an end view of the target probe 310 as viewed from a position where the holder 31e is located. In the magnetic substance section 31a, the two silicon steel plates 31a1 having the greatest length among the four pairs are disposed innermost of the section 31a, the two silicon steel plates 31a2 having a similar or slightly smaller length than the silicon steel plates 31a1 are disposed on both sides of the silicon steel plates 31a1, the two silicon steel plates 31a3 having a smaller length than the silicon steel plates 31a2 are disposed on both sides of the silicon steel plates 31a2, and the two silicon steel plates 31a4 having the smallest length are disposed outermost of the section 31a. The silicon steel plates 31a1, 31a2, 31a3 and 31a4 each have a stopper projection S formed on a proximal end portion thereof and are laminated together with the respective stopper projections S aligned with one another in a thickness direction of the section 31a. Each of the silicon steel plates 31a1, 31a2, 31a3 and 31a4 is shaped to have the proximal end portion having the stopper portion S, an intermediate portion that does not vary in area (volume) over a given length range from the proximal end portion and a portion that gradually decreases in area (volume) from the intermediate portion toward a distal end portion of the steel plate. Consequently, the magnetic substance section 31a comprising a laminated structure of the silicon steel plates as a whole has a shape gradually decreasing in volume from a proximal end portion, having the stopper portions S, toward a distal end portion opposite from the proximal end portion. Needless to say, the shape of each of the silicon steel plates 31a1, 31a2, 31a3 and 31a4 (e.g., the length and shape of the portion that gradually varies in area (volume), the length of the portion that does not vary in area (volume), etc.) may be designed as necessary in accordance with a stroke length (i.e., object of detection) and/or the like, and what is shown in FIGS. 8A and 8B is merely an illustrative example. The portion that gradually varies in area (volume) in the illustrated example of FIGS. 8A and 8B has a relatively small length, which means that the stroke length (i.e., object of detection) by the illustrated example is relatively small. In order to allow the illustrated example of FIGS. 8A and 8B to be applied to a relative great stroke length, the illustrated example is designed such that the portion that gradually varies in area (volume) extends close to the proximal end portion.

To assemble the target probe 310, a ring-shaped shim 31f is placed on the other end of the sheath tube 31b, the magnetic substance section 31a, comprising the laminated structure of the silicon steel plates, is inserted into the sheath tube 31b through the other end side of the sheath tube 31b, the stopper projections S are pressed against the other end of the sheath tube 31b, and then the stopper portions S are fixed to the sheath tube 31b by means of a retainer ring 31b. Thus, the individual silicon steel plates are accurately positioned within the sheath tube 31b. After that, the soft resin mold material 31c is filled into the sheath tube 31b through the one end side of the sheath tube 31b, and finally the sheath tube 31b is sealed at the one end with a cap 31d. The soft resin mold material 31c serve to prevent an external shock from being applied to the silicon steel plates accommodated in the sheath tube 31b, to thereby prevent a magnetic character of the silicon steel plates from changing due to an external shock. As obvious to one skilled in the art, of various component parts of the target probe 310, only the silicon steel plates 31a1, 31a2, 31a3 and 31a4 are formed of a magnetic substance, and all of the other component parts are formed of a non-magnetically-responsive (non-magnetic and non-conductive) substance. For example, the sheath tube 31b, cap 31d, holder 31e, shim 31f and retainer ring 31g may be formed of stainless.

It is preferable that, as the plurality of silicon steel plates 31a1, 31a2, 31a3 and 31a4 constituting one target probe 310, a plurality of silicon steel plates be cut out from different silicon steel plate base materials and used randomly. This is because a high-level manufacturing technique is required to mass-produce silicon steel plate base materials whose magnetic character may be said to be sufficient for actual use and thus it is difficult to mass-produce silicon steel plate base materials of a uniform magnetic character. Thus, if one target probe 310 is composed only of a plurality of silicon steel plates cut out from one and the same silicon steel plate base material, the target probe 310 may greatly differ in magnetic character from another silicon steel plate composed only of a plurality of silicon steel plates cut out from another silicon steel plate base material. By contrast, if silicon steel plates are cut out from different silicon steel plate base materials and used randomly as the plurality of silicon steel plates 31a1, 31a2, 31a3 and 31a4 constituting one target probe 310 as noted above, then magnetic characters of individual target probes 310 can be advantageously averaged.

The invention claimed is:

1. A flow rate control valve comprising:
a spool having a plurality of valve members and slidably accommodated in a sleeve having a plurality of ports, said flow rate control valve performing flow rate control by linearly moving the spool with an actuator;
a generally straight target probe formed of a magnetically-responsive substance and mounted to one end of the spool, the sleeve having an opening formed at one end thereof to permit passage there through of said target probe;
a sensor housing mounted to the one end of the sleeve for detecting a linear position of said target probe, said sensor housing having a cylinder section formed of a non-magnetic substance and defining an inner space to permit entry therein of said target probe, the inner space communicating with the opening formed in the one end of the sleeve;
first and second coils disposed around the cylinder section within said sensor housing and axially spaced from each other by a predetermined distance; and
a ring-shaped magnetically-responsive shield member inside said second coil, wherein said first coil is disposed so as to respond to said target probe, wherein said target probe has a tapered section that is elongated in an axial direction thereof so that its volume gradually decreases toward a distal end thereof so that magnetic response of said first coil gradually varies in one direction in response to a linear position of said target probe, wherein said second coil is configured to not respond to linear displacement of said target probe at least within a predetermined linear displacement range of said target probe, wherein a linear position of said target probe, and hence a position of the spool, is detected through differential synthesis performed between outputs of the first and second coils, wherein said first coil is located nearer to said target probe than said second coil, and wherein the distal end of said target probe is extendable into a sensitive region of said second coil.

2. The flow rate control valve as claimed in claim 1, further comprising a circuit for A.C. energizing said first and second coils and a circuit for generating and outputting position detection data, said circuits being accommodated in a space around the cylinder section within said sensor housing.

3. The flow rate control valve as claimed in claim 1, further comprising:
   a circuit for rectifying an A.C. detection signal, obtained through the differential synthesis between the outputs of the first and second coils, to thereby generate a D.C. detecting voltage signal; and
   a gain setting circuit for amplifying the D.C. detecting voltage signal,
   wherein said gain setting circuit includes a gain setting resistance element having a predetermined temperature characteristic and sets the predetermined temperature characteristic of the gain setting resistance element so as to cancel out impedance variation caused by eddy current loss and a temperature characteristic of an element in said gain setting circuit.

4. The flow rate control valve as claimed in claim 1, wherein:
   a size of the opening at the one end of the sleeve and a mounting structure of said sensor housing for mounting to the one end of the sleeve are configured to be usable for a plurality of types of flow rate control valves differing from each other in maximum displacement amount of the spool,
   the inner space defined by the cylinder section within the sensor housing has a length to allow accommodating a longest maximum displacement amount of the spool among the plurality of types of flow rate control valves,
   said sensor housing having the first and second coils accommodated therein is configured to accommodate the plurality of types of flow rate control valves with the target probe of a different size usable for each of the plurality of types of flow rate control valves.

5. The flow rate control valve as claimed in claim 1, wherein said target probe comprises a laminated structure of a plurality of silicon steel plates.

6. The flow rate control valve as claimed in claim 5, wherein said laminated structure of a plurality of silicon steel plates is molded of resin.

7. A flow rate control valve comprising:
   a spool having a plurality of valve members and slidably accommodated in a sleeve having a plurality of ports, said flow rate control valve performing flow rate control by linearly moving the spool with an actuator;
   a generally straight target probe formed of a magnetically-responsive substance and mounted to one end of the spool, the sleeve having an opening formed at one end thereof to permit passage there through of said target probe;
   a sensor housing mounted to the one end of the sleeve for detecting a linear position of said target probe, said sensor housing having a cylinder section formed of a non-magnetic substance and defining an inner space to permit entry therein of said target probe, the inner space communicating with the opening formed in the one end of the sleeve; and
   first and second coils disposed around the cylinder section within said sensor housing and axially spaced from each other by a predetermined distance,
   wherein said first coil is disposed so as to respond to said target probe,
   wherein said target probe has a tapered section that is elongated in an axial direction thereof so that its volume gradually decreases toward a distal end thereof so that magnetic response of said first coil gradually varies in one direction in response to a linear position of said target probe,
   wherein said second coil is configured to not respond to linear displacement of said target probe at least within a predetermined linear displacement range of said target probe,
   wherein a linear position of said target probe, and hence a position of the spool, is detected through differential synthesis performed between outputs of the first and second coils,
   wherein said first coil is located nearer to said target probe than said second coil,
   wherein the distal end of said target probe is extendable into a sensitive region of said second coil, and
   wherein said target probe has a shape configured so that, when the distal end thereof has entered the sensitive region of said second coil, a predetermined portion of said target probe close to a proximal end thereof enters a sensitive region of said first coil and enhances a degree of sensitivity of said first coil so as to cancel out sensitivity of said second coil with the predetermined portion close to the proximal end.

8. A spool position detection device for a flow rate control valve that includes a spool having a plurality of valve members and slidably accommodated in a sleeve having a plurality of ports, said flow rate control valve performing flow rate control by linearly moving the spool by means of an actuator, said spool position detection device comprising:
   a generally straight target probe of a magnetically-responsive substance and mountable to one end of the spool, the sleeve having an opening formed at one end thereof to permit passage therethrough of said target probe;
   a sensor housing mountable to the one end of the sleeve for detecting a linear position of said target probe, said sensor housing having a cylinder section formed of a non-magnetic substance and defining an inner space to permit entry therein of said target probe, the inner space communicable with the opening formed at the one end of the sleeve;
   first and second coils disposed around the cylinder section within said sensor housing and axially spaced from each other by a predetermined distance; and
   a ring-shaped magnetically-responsive shield member inside said second coil, wherein said first coil is disposed so as to respond to said target probe, wherein said target probe has a tapered section that is elongated along an axial direction thereof so that its volume gradually decreases toward a distal end thereof so that magnetic response of said first coil gradually varies in one direction in response to a linear position of said target probe, said second coil is configured to not respond to linear displacement of said target probe at least within a predetermined linear displacement range of said target probe, wherein a linear position of said target probe, and hence a position of the spool, is detected through differential synthesis performed between outputs of the first and second coils, wherein said first coil is located nearer to said target probe than said second coil, and wherein the distal end of said target probe is extendable into a sensitive region of said second coil.

9. The spool position detection device as claimed in claim 8, further comprising:

a circuit for rectifying an A.C. detection signal, obtained through the differential synthesis between the outputs of the first and second coils, to thereby generate a D.C. detecting voltage signal; and a gain setting circuit for amplifying the D.C. detecting voltage signal, wherein said gain setting circuit includes a gain setting resistance element having a predetermined temperature characteristic and sets the predetermined temperature characteristic of the gain setting resistance element so as to cancel out impedance variation caused by eddy current loss and a temperature characteristic of an element in said gain setting circuit.

10. The spool position detection device as claimed in claim 8, wherein:

a size of the opening formed in the one end of the sleeve and a mounting structure of said sensor housing for mounting to the one end of the sleeve are configured to accommodate a plurality of types of flow rate control valves differing from each other in an maximum displacement amount of the spool, the inner space defined by the cylinder section has a length for accommodating a longest maximum displacement amount of the spool among the plurality of types of flow rate control valves, said sensor housing having the first and second coils accommodated therein is configured to accommodate the plurality of types of flow rate control valves with the target probe of a different size usable for each of the plurality of types of flow rate control valves.

* * * * *